(12) United States Patent
Ostuni et al.

(10) Patent No.: US 11,053,119 B2
(45) Date of Patent: Jul. 6, 2021

(54) PROCESS FOR PRODUCING A SYNTHESIS GAS

(71) Applicant: Casale SA, Lugano (CH)

(72) Inventors: Raffaele Ostuni, Lugano (CH); Geoffrey Frederick Skinner, Reading (GB); Ermanno Filippi, Castagnola (CH)

(73) Assignee: Casale SA, Lugano (CH)

( * ) Notice: Subject to any disclaimer, the term of this patent is extended or adjusted under 35 U.S.C. 154(b) by 0 days.

(21) Appl. No.: 16/889,265

(22) Filed: Jun. 1, 2020

(65) Prior Publication Data

US 2020/0290870 A1 Sep. 17, 2020

Related U.S. Application Data

(62) Division of application No. 15/524,845, filed as application No. PCT/EP2015/072992 on Oct. 6, 2015, now Pat. No. 10,669,154.

(30) Foreign Application Priority Data

Nov. 6, 2014 (EP) .................................... 14192002
Apr. 9, 2015 (EP) .................................... 15162906

(51) Int. Cl.
*C01B 3/38* (2006.01)
*C01B 3/02* (2006.01)
(Continued)

(52) U.S. Cl.
CPC ............ *C01B 3/384* (2013.01); *B01D 53/229* (2013.01); *B01J 8/067* (2013.01); *C01B 3/025* (2013.01);
(Continued)

(58) Field of Classification Search
CPC ............ C01B 3/384; C01B 2203/0255; C01B 2203/0244; C01B 2203/0405;
(Continued)

(56) References Cited

U.S. PATENT DOCUMENTS 4,387,653 A 6/1983 Voss
6,448,441 B1 9/2002 Wing-Chiu et al.
(Continued)

FOREIGN PATENT DOCUMENTS

CN 1869165 A 11/2006
CN 101058406 A 10/2007
(Continued)

OTHER PUBLICATIONS

International Search Report issued in connection with PCT/EP2015/072992.

(Continued)

*Primary Examiner* — Anthony J Zimmer
(74) *Attorney, Agent, or Firm* — Akerman LLP

(57) ABSTRACT

Process for manufacturing a hydrogen-containing synthesis gas from a natural gas feedstock, comprising the conversion of said natural gas into a raw product gas and purification of said product gas, the process having a heat input provided by combustion of a fuel; said process comprises a step of conversion of a carbonaceous feedstock, and at least a portion of said fuel is a gaseous fuel obtained by said step of conversion of said carbonaceous feedstock.

1 Claim, 4 Drawing Sheets

(51) Int. Cl.
*C10K 1/00* (2006.01)
*C10J 3/00* (2006.01)
*C10J 3/46* (2006.01)
*B01D 53/22* (2006.01)
*B01J 8/06* (2006.01)
*C10J 3/82* (2006.01)
*F25J 3/02* (2006.01)

(52) U.S. Cl.
CPC ............... *C10J 3/002* (2013.01); *C10J 3/463* (2013.01); *C10J 3/82* (2013.01); *C10K 1/005* (2013.01); *F25J 3/0223* (2013.01); *F25J 3/0233* (2013.01); *B01J 2208/00504* (2013.01); *B01J 2219/00024* (2013.01); *C01B 2203/025* (2013.01); *C01B 2203/0233* (2013.01); *C01B 2203/0244* (2013.01); *C01B 2203/0255* (2013.01); *C01B 2203/0288* (2013.01); *C01B 2203/0405* (2013.01); *C01B 2203/046* (2013.01); *C01B 2203/0415* (2013.01); *C01B 2203/0445* (2013.01); *C01B 2203/0455* (2013.01); *C01B 2203/0475* (2013.01); *C01B 2203/0485* (2013.01); *C01B 2203/061* (2013.01); *C01B 2203/068* (2013.01); *C01B 2203/0811* (2013.01); *C01B 2203/0822* (2013.01); *C01B 2203/127* (2013.01); *C01B 2203/1241* (2013.01); *C01B 2203/84* (2013.01); *C10J 2300/093* (2013.01); *C10J 2300/0943* (2013.01); *C10J 2300/0956* (2013.01); *C10J 2300/0959* (2013.01); *C10J 2300/0976* (2013.01); *C10J 2300/0996* (2013.01); *C10J 2300/1668* (2013.01); *C10J 2300/1678* (2013.01); *C10J 2300/1838* (2013.01); *C10J 2300/1853* (2013.01); *Y02P 20/10* (2015.11); *Y02P 20/129* (2015.11)

(58) Field of Classification Search
CPC .... C01B 2203/0415; C01B 2203/0445; C01B 2203/84; C01B 2203/025; C01B 2203/0288; C01B 2203/1241; C01B 2203/061; C01B 2203/046; C01B 2203/0233; C01B 2203/0455; C01B 2203/0475; C01B 2203/0485; C01B 2203/068; C01B 2203/0811; C01B 2203/127; C01B 2203/0822; C01B 3/025; C10K 1/005; F25J 3/0223; F25J 3/0233; B01D 53/229; B01J 8/067; B01J 2208/00504; B01J 2219/00024; C10J 2300/093; C10J 2300/0943; C10J 3/463; C10J 3/002; C10J 3/82; C10J 2300/1853; C10J 2300/0996; C10J 2300/0976; C10J 2300/0959; C10J 2300/0956; C10J 2300/1838; C10J 2300/1678; C10J 2300/1668; Y02P 20/13; Y02P 20/128
See application file for complete search history.

(56) References Cited

U.S. PATENT DOCUMENTS

| | | |
|---|---|---|
| 2007/0289214 A1 | 12/2007 | Briesch et al. |
| 2009/0246118 A1 | 10/2009 | Drnevich et al. |
| 2010/0121125 A1 | 5/2010 | Hippo et al. |
| 2010/0280137 A1 | 11/2010 | Kukkonen et al. |
| 2014/0256993 A1 | 9/2014 | Melnichuk et al. |

FOREIGN PATENT DOCUMENTS

| | | |
|---|---|---|
| CN | 101235327 A | 8/2008 |
| CN | 102159683 A | 8/2011 |
| CN | 103214334 A2 | 7/2013 |
| EP | 1992591 A1 | 11/2008 |
| EP | 2662327 A1 | 11/2013 |

OTHER PUBLICATIONS

International Preliminary Report on Patentability issued in connection with PCT/EP2015/072992.
Higman et al., "Gasification," Elsevier, Oct. 8, 2003, pp. 98-102.

PROCESS FOR PRODUCING A SYNTHESIS GAS

CROSS-REFERENCE TO RELATED APPLICATIONS

This application is a divisional of U.S. patent application Ser. No. 15/524,845, filed May 5, 2017, which is a national phase of PCT/EP2015/072992, filed Oct. 6, 2015, and claims priority to EP 14192002.5, filed Nov. 6, 2014, and EP15162906.0, filed Apr. 9, 2015, the entire contents of all of which are hereby incorporated by reference.

FIELD OF APPLICATION

The invention concerns a process for producing a hydrogen-containing synthesis gas from a natural gas feedstock, a related plant and a method of revamping of related plants. The invention relates in particular to production of ammonia synthesis gas comprising hydrogen and nitrogen in about 3:1 molar ratio.

PRIOR ART

The production of synthesis gas from a hydrocarbon feedstock usually involves a combined reforming process in which a primary reformer is fed with desulphurized hydrocarbons and steam and a secondary reformer receives the partially reformed gas from the primary reformer and a flow of a suitable oxidant, for example air or oxygen.

The reformed gas exiting the secondary reformer is then typically treated in a series of down-stream equipment items to obtain a synthesis gas with a composition suitable for a specific use.

For example, the synthesis of ammonia ($NH_3$) requires a synthesis gas comprising hydrogen ($H_2$) and nitrogen ($N_2$) in a suitable molar ratio of about 3:1, the so called make-up gas. The term ammonia syngas is commonly used with reference to a synthesis gas with the above composition.

The ammonia syngas is generally produced in a front-end section and the conversion of said synthesis gas into ammonia is carried out in a synthesis loop.

From an efficiency standpoint, the ideally suited hydrocarbon feedstock for the manufacture of ammonia syngas is natural gas, because it is characterized by one of the highest contents of hydrogen among all fossil fuels.

An example of process for the production of ammonia syngas starting from natural gas is disclosed in EP 2 065 337.

The production of ammonia syngas requires combustion of a certain amount of a fuel for generating the reforming heat; a further amount of fuel is typically used to produce steam and to power steam turbines which drive machines such as pumps or compressors, including the air compressors and the gas compressors which raise the pressure of the generated make-up gas to the pressure of the ammonia synthesis.

For this purpose, the common approach of natural gas-based plants is to use a portion of the natural gas feedstock as fuel. Around 30-40% of the total consumption of natural gas is typically used as fuel, in particular for firing of the primary reformer. The plant may also include natural gas-fired auxiliary boilers to generate the additional steam required by the process.

EP 2 662 327 describes a process for the production of ammonia where natural gas fed to the plant is split substantially into two portions: a first portion (named process fraction) is used as reactant for the reforming process and a second portion (named fuel fraction) is used for the operation of the plant.

However, in recent times limitations of quantity of natural gas and an increasing instability of international hydrocarbon markets have emerged. As a consequence, synthesis gas plants in locations where the natural gas is expensive and/or is available in a limited amount must minimize the consumption of natural gas. Hence, the processes available today may be too expensive to operate, especially where gas costs are high.

In order to tackle the problem of how to maintain or increase the production of synthesis gas facing a limited supply of natural gas, the interest in alternative hydrocarbon sources technologies has been increasing. Among the available sources, coal is of great interest thanks to its wide availability and inexpensiveness, representing a feasible alternative feedstock for the production of hydrogen-containing synthesis gas and ammonia synthesis gas.

Coal-to-ammonia plants have been proposed, wherein coal is gasified at high pressures and high temperatures, in the presence of steam and a limited amount of oxygen, and provides a synthesis gas containing mainly carbon monoxide and hydrogen. Said gas is then purified through a series of steps including for example removal of particulates, sour gas shift where CO is converted to CO2, removal of CO2 and H2S in an acid gas removal unit.

A disadvantage of coal to ammonia plants is that they are much more expensive than gas based plants. One of drawbacks of said technique is that the gas originated by the gasification of coal also contains significant amounts of sulphur components (mostly H2S and COS) and other impurities (including chlorides, HCN, ammonia, metals), which must be completely removed in order to use said gas as process gas. However, the front-end of an existing ammonia plant is generally not able to process such coal-based process gas without an extensive and expensive revamping. Therefore, the prior art coal-to-ammonia technology requires a high investment cost and is not attractive for revamping of existing plants.

SUMMARY OF THE INVENTION

The invention aims at overcoming the drawbacks of the prior art as above discussed. In particular, the invention proposes to reduce the total natural gas consumption and simultaneously to produce a hydrogen-containing synthesis gas pure enough so as to avoid extensive purification treatments, which would imply the process equipment being exposed to detrimental substances; to provide a more environmentally friendly use of coal and other carbonaceous feedstock as energy source; to save capital costs and reduce energy consumption.

These objects are achieved with a process for the production of a hydrogen-containing synthesis gas from a natural gas feedstock according to claim 1, and a plant and method of revamping according to the attached claims. Preferred embodiments are disclosed in the dependent claims.

Said process comprises the conversion of natural gas into a product gas which is then suitably purified. At least part of a heat input to said process is provided by combustion of a fuel and at least part of said fuel is a gaseous fuel obtained by the conversion of a carbonaceous feedstock.

Natural gas is still used as process feedstock for the production of the hydrogen-containing synthesis gas, while fuel is at least partially supplied by the conversion of the carbonaceous feedstock. Accordingly, one of the major advantages of the invention is that the natural gas previously used as a fuel can be redirected for use as process feedstock.

Said heat input may include a process heat, e.g. of a primary reformer, and/or heat for production of steam to drive steam turbines for compressors, pumps or the like.

Said conversion of the carbonaceous feedstock denotes partial oxidation reactions carried out in the presence of an oxygen-containing stream and usually of water or steam. Preferably the gaseous fuel from said conversion contains carbon monoxide and hydrogen, being suitable for replacing at least partially the natural gas-based fuel commonly used in the prior art.

Said carbonaceous feedstock in some embodiments is in solid or liquid form. A solid or liquid feedstock preferably comprises at least one among coal, lignite, coal-derived coke, petroleum coke and a liquid such as heavy fuel oil.

The above are available at moderate cost in many geographical areas and in such areas represent an economically viable alternative to natural gas fuel. The conversion of a solid or liquid carbonaceous feedstock into a gaseous fuel is also referred to as gasification.

According to other embodiments, said carbonaceous feedstock is gaseous. In such a case the conversion of said carbonaceous feedstock into a suitable fuel may be a partial oxidation, either catalytic or not.

Preferred applications of the invention include: a process for making ammonia starting from natural gas; a process for making ammonia and urea (ammonia/urea process); a process for making methanol; processes for making other synthesis gas derived products, such as hydrogen or carbon monoxide or Fischer-Tropsch products or oxo-alcohols or gasoline through methanol.

Conversion of natural gas (process gas) may include reforming or partial oxidation of said natural gas into a reformed gas or partially oxidized gas, respectively.

Preferably said conversion of natural gas includes a reforming step in a reforming section. Said reforming section may include a steam reformer. According to various embodiments, said reforming section may include at least one of a primary steam reformer and a gas heated reformer (GHR), and optionally a secondary reformer, the latter being fed with air, oxygen or enriched air. In some embodiments, the reforming section includes an auto-thermal reformer (ATR). A pre-reformer may also be included in any of the above embodiments.

In one of the embodiments of the invention, said reforming section only comprises a steam reformer i.e. a primary reformer without a subsequent secondary reformer. Reforming performed solely in a primary steam reformer is also termed pure reforming. Preferably, pure reforming is carried out at relatively low pressure (i.e. 10-30 bar at the reformer catalyst tubes outlet) and high temperature (i.e. more than 850° C. at the reformer catalyst tubes outlet), in order to maximize the production of hydrogen per unit of natural gas used for the process fraction. According to some embodiments, a step pre-reforming may be included in the pure reforming.

Embodiments with pure reforming are advantageous in particular when the hydrogen-containing gas is used to make methanol or to make ammonia in an ammonia-urea plant. An ammonia-urea plant is where some or all of the ammonia is further reacted with carbon dioxide to form urea.

The advantages of the pure reforming in combination with the invention are discussed in the following paragraphs.

In the methanol production, it is desired that the make-up gas has a molar ratio between (H2-CO2) and (CO+CO2) equal to 2. Pure steam reforming, however, produces a gas having said ratio equal to 3, which means that hydrogen is in excess and the syngas need to be balanced. One way of balancing the methanol make-up syngas is to combine the steam reforming with oxygen auto-thermal reforming, as known in the art. The invention provides a source of CO2 which can be used to this purpose. CO2 can be recovered from the effluent of the conversion process of the carbonaceous feedstock and added to the make-up gas, to balance the excess hydrogen. Hence, the invention allows producing a balanced methanol make-up gas with a pure steam reforming, which is less expensive and consumes less natural gas (as process gas) than a conventional primary and secondary setup. In other words, the recovered CO2 provides part of the carbon for the product methanol, thus reducing the natural gas consumption as to the process fraction.

In the prior art, the excess hydrogen is recovered with the purge of the synthesis loop and used as a fuel. By balancing the make-up gas, the invention allows using the full amount of hydrogen as a process gas (i.e. to make methanol) instead of fuel, the necessary fuel being furnished by the conversion of a carbonaceous feedstock. It follows that the natural gas consumption of the whole plant (as amount of gas/tons of methanol produced) is reduced compared to a prior art with primary and secondary reforming. For example the consumption may be 25% lower.

In the ammonia-urea production, the pure reforming would result in a lack of CO2 for urea synthesis. The invention solves this drawback thanks to the CO2 recoverable from the effluent of the conversion process of a carbonaceous feedstock, thus allowing the use of the pure steam reforming.

In other words, the conversion of a carbonaceous feedstock provides a convenient route for additional CO2 production, hence a means of making up said shortage of CO2 and permitting complete conversion of the ammonia produced into urea.

Limitations of using pure reforming in an ammonia-urea plant, such as lack of nitrogen for the ammonia synthesis, lower overall energy efficiency and lower single train syngas capacity other than lack of CO2 for urea synthesis, are fully compensated by the significant reduction in natural gas consumption as to process fraction.

Further ways to reduce the natural gas consumption, according to the invention, include: increasing the steam-to-carbon ratio (e.g. to values higher than 3), reducing the purge gas leaving the synthesis loop of the ammonia plant, installing an additional (e.g. third) water-gas shift reactor or installing a hydrogen recovery unit (HRU). Preferably, but not exclusively, the above features are combined with the performing of a pure steam reforming A further aspect of the invention relates to recovery of CO2. Removal of carbon dioxide from the fuel gas, for example by a washing process, can be performed for purposes such as increasing the calorific value of said fuel gas, or carbon dioxide sequestration.

Preferably, CO2 is directly recovered from a portion of the fuel gas generated in the conversion process of a carbonaceous feedstock.

According to preferred embodiments, said portion of the fuel gas is subjected to water-gas shift in order to maximise the recovery of CO2, by converting the carbon monoxide contained therein into carbon dioxide. Carbon dioxide is subsequently separated, e.g. in a washing unit.

Further advantages of operating water-gas shift are higher heating value of the fuel gas after removal of the CO2 and greater safety owing to the reduced CO partial pressure in the fuel gas.

The above techniques for recovery of CO2 are applicable to all embodiments of the invention. When pure steam reforming is used, said pure steam reforming is preferably followed by two steps of water-gas shift (high and low temperature shift), or by a near-isothermal medium temperature shift and optionally one step of methanation, in order to maximize the recovery of carbon dioxide and the production of hydrogen per unit of natural gas used for the process fraction.

The gasification of a solid carbonaceous feedstock is advantageously carried out in a fluidized bed or in a transport reactor. A gasification reactor where a solid or liquid feedstock is converted into a gaseous fuel is referred to as gasifier.

A further aspect of the invention is that a low temperature and low-pressure gasifier can be successfully used. A low temperature/low-pressure (LT/LP) gasifier is understood as operating at no more than 1000° C. and no more than 20 bar.

In the prior art, said LT/LP gasifiers are known to suffer the drawback of larger residual amount of unreacted methane ($CH_4$) or other light hydrocarbons (e.g. ethane, $C_2H_6$) in the effluent Thanks to the invention, the overall efficiency is not affected by this drawback since the effluent of the gasifier is used as fuel (not as process gas) and said unreacted methane or other hydrocarbons increases the heating value. On the other hand, a LT/LP gasifier has a lower cost and lower consumption of oxidant and coal for a given gas fuel output, compared to a gasifier of the same capacity but working at a higher temperature and/or pressure.

According to some embodiments of the invention, a methane-rich stream can be separated from the gasifier effluent at appropriate points. This methane-rich stream can be recycled back as reforming feedstock (process gas) to further reduce the natural gas consumption, lowering the consumption of gas as process fraction. According to other embodiments, said methane-rich stream is used to provide part of the fuel required to drive a gas turbine or gas engine. Gas turbines or gas engines operating on a methane-rich gas are cheaper, more common and more efficient than those operating on syngas containing high percentages of H2, especially in the power range up to 50 MW which is typical of chemical production facilities.

The gasifier may be reduced in size by selecting a reforming section that includes a gas heated reformer (GHR), such as a section including a primary steam reformer, a GHR and a secondary reformer. By routing the effluent of the primary or secondary reformer to the shell side of the GHR, heat is provided to the tubes of the GHR. Hence, less fuel is required for the primary steam reformer, which means lower amounts of the carbonaceous feedstock to be gasified, hence smaller dimensions of the gasifier. This is advantageous especially if the plant has coal-fired auxiliary boilers.

According to further embodiments, a reduction in the fuel consumption is obtained by pre-heating the natural gas feed or the mixed feed (i.e. comprising steam and natural gas) of the primary reformer using heat available downstream the gasifier, either in a heat exchanger or in a GHR.

The gasifier can be operated with air or oxygen or a mixture thereof as the oxidant. In case of oxygen or oxygen-enriched air, the heating value of the produced fuel gas is higher than with air, and the flame temperature achievable by combustion of the fuel gas is higher.

Further aspects of the invention concern the treatment of the gaseous fuel before combustion, for example to remove impurities such as solid particles, sulphur compounds, methane and carbon dioxide.

Solid residues from the gasification process, i.e. ash and unconverted carbon, are partly removed from the gasifier, while fine particulate matter still present in the gaseous fuel downstream the gasifier may be removed in a cyclone or gas filter or by direct contact with water. The gasifier may be advantageously of the ash-agglomerating type.

Sulphur may be contained in the carbonaceous feedstock (e.g. coal). A certain amount of sulphur in the feedstock may cause the formation of compounds such as hydrogen sulphide ($H_2S$) and COS during the conversion of feedstock into fuel. At least a partial removal of sulphur compounds from the fuel gas is desirable for environmental reasons and to avoid sour condensation of the flue gas which attacks the exchanger surfaces in the reformer, fired heaters and boilers.

An advantage of the invention over the coal-to-chemicals process is that the tolerable amount of sulphur in the fuel gas is significantly greater (e.g. two orders of magnitude) than in synthesis gas (process gas), meaning that simplified sulphur removal techniques can be used. A simple and cheap sulphur separation method such as in-situ desulphurization or warm desulphurization process based on sulphur adsorption may be used, as better described below. Said processes would not be suitable for a coal-to-chemicals plant, because they would not meet the strict gas purity requirements of the downstream sections.

In a particular embodiment of the invention, at least part of the sulphur contained in the carbonaceous feedstock is removed in situ within the gasifier. The gasifier is additionally supplied with a stream of a suitable sorbent such as dolomite ($MgCa(CO_3)_2$) or limestone ($CaCO_3$) and an amount of sulphur present in the feedstock is absorbed by the sorbent typically in the form of calcium sulphide. The spent sorbent is discharged from the gasifier for further treatment or disposal.

Besides the apparent simplification of the process, which does not require dedicated downstream treatments for sulphur removal, the in situ desulphurization also has the following advantages.

First, the gas is advantageously fired at a temperature above the dew point (e.g. at 300° C.) since the change in water vapor contained in the flue gas (derived from the residual water vapor in the fuel) is small. Cooling of the gas below the dew point (i.e. around 200° C.) would instead require expensive equipment due to the formation of a sour and corrosive process condensate containing sulphur compounds and $NH_4Cl$. In addition, the condensate would contain higher hydrocarbons and alcohols, relatively difficult to eliminate from the water. According to said embodiment, the above problems are avoided, which means higher reliability of the process and absence of significant adverse effects on the downstream units.

Firing the gas from the gasifier at a temperature higher than the dew point is also more efficient due to the recovery of the gas full enthalpy, on top of the combustion, Otherwise, at least part of the water vapor latent heat would be lost.

According to another embodiment, sulphur compounds (mainly H2S and COS) in the gaseous fuel leaving the gasifier are adsorbed on a suitable sorbent (e.g. a metal oxide sorbent like zinc oxide). The sorbent is preferably loaded and then regenerated in a circulating fluid bed. Said process is preferably carried out at high temperatures, i.e. higher than the gas dew point, thereby obtaining the same advantages above. The sulphur is separated for example as sulphur dioxide (SO2).

In a further embodiment of the invention, the gaseous fuel leaving the gasifier and containing sulphur compounds is contacted in a gas liquid absorber, with a liquid able to separate the sulphur components from the gas, such as an amine solution. The rich liquid is discharged from the absorber for external regeneration, with optional production of sulphuric acid (e.g. by means of the Wet Sulphuric Acid process) or, more preferably, production of elemental sulphur by a catalytic sulphur recovery process (i.e. Claus Process) or a suitable biological process.

In other embodiments, said gaseous fuel containing H2S is subjected to a biological process, which directly provides elemental sulphur.

The load of the above desulphurization processes may be reduced by carrying out water-gas shift in sour conditions, which converts sulphur compounds (e.g. COS) into hydrogen sulphide (H2S), or by first hydrolysing COS and then subjecting it to a "sweet" water-gas shift. Another related advantage is that carbon dioxide is removed prior to combustion and CO2 emissions into atmosphere are reduced.

As explained above, the gaseous fuel from the gasifier may also contain a significant amount of unreacted methane (e.g. 5% molar or greater) and smaller amounts of other hydrocarbons, such as e.g. ethane. A methane-rich stream is advantageously separated from the fuel stream after the desulphurization process by a suitable recovery process, such as cryogenic separation or separation through membrane.

At least a portion of carbon dioxide may be removed from the gaseous fuel leaving the gasifier after the gasification step. CO2 recovery from said gaseous fuel is easier than conventional CO2 recovery from combustion flue gas when some of the natural gas is used as fuel.

Said carbon dioxide can be addressed to specific uses. For example, as already stated above, carbon dioxide can be used for the production of urea in an ammonia-urea integrated plant.

The gaseous fuel, typically depleted in its sulphur content as described above, is fed preferably to one or more burners installed in one or more of the following devices: a radiant section of a primary reformer; a convective section of a primary reformer; a desulphurizer pre-heater arranged to preheat said natural gas before desulphurization and subsequent reforming; a process fired heater; an auxiliary steam generator; a steam superheater; an HRSG (Heat Recovery Steam Generator) cooling the exhaust of a gas turbine; a gas turbine (for power generation or for driving a machine such as a compressor).

In the embodiments featuring the removal of hydrogen sulphide within the gasifier, the partly desulphurized gas leaving the gasifier may be fed to one or more of the above mentioned users after a simplified treatment including a cooling step and removal of entrained particles, without further treatment.

The invention also concerns a related plant and method of revamping according to the claims.

A method of revamping according to the invention provides that a plant fed with a natural gas feedstock and wherein said natural gas feedstock is split into a first fraction (process fraction) used as process gas and a second fraction (fuel fraction) used as fuel, is revamped by addition of a section wherein a carbonaceous feedstock is converted (e.g. coal is gasified) to produce a fuel, and said fuel replaces at least part of said second fraction of the natural gas. Preferably, said at least part of said second fraction of natural gas, originally used as fuel, is redirected for use as process gas.

Some of the advantages of the invention have already been discussed. A major advantage is less requirement of natural gas compared to the capacity in terms of the chemical product (e.g. ammonia or methanol).

One of the advantages of the invention is the use of a low-cost hydrocarbon source, such as coal, for the provision of the fuel, while the more valuable natural gas is entirely directed to the process line. The investment cost for implementation of the coal gasification section is significantly lower than the investment cost for a coal-to-chemical plant.

This advantage is important also for a revamping of an existing plant. For example, a coal-to-chemical approach would totally replace natural gas with coal, leading however to a high investment cost for meeting the purity requirements of process gas. The present invention provides that coal-derived fuel gas replaces the amount of natural gas originally used as a fuel fraction (typically 30-40% of the input), which is of more economic interest. Hence, the invention provides a rather inexpensive way to drastically reduce the total natural gas consumption or increase the capacity for a given (available) amount of natural gas.

Generation of coal-derived fuel via gasification is more advantageous than simply providing a coal-fired boiler to replace the natural gas-fired auxiliary boiler, for the following reasons:
  more natural gas fuel can be replaced with coal-derived fuel gas,
  coal gasification can also be successfully applied to stand-alone plants, where there is no, or minimal firing of the auxiliary boiler,
  when applied as a revamp, it does not require replacement of the fired heaters or the auxiliary boiler.

A further advantage is the environmentally friendly use of a carbonaceous feedstock, such as coal. Impurities are removed in the gasification process or downstream thereof, and a relatively pure stream of fuel is provided. Said impurities mainly comprise sulphur which gets converted to hydrogen sulphide and carbonyl sulphide, and other compounds such as CO2, HCN, NH3 and metals. Removal of said impurities before combustion is advantageous being much easier and more practical than removal from flue gas of a coal boiler.

Another advantage of the present invention is that the gasifier can be run at relatively low pressure, since the typical fuel pressure required at the burners is 3 to 5 bar. This reduces the capital cost of the gasifier and downstream equipment, and the capital cost for compression of the oxidant. Moreover, in oxygen-fired embodiments, oxygen with a moderate purity can be used thereby reducing the cost and consumption for air separation. The air separation unit may even be a PSA (pressure swing) or a VPSA (vacuum pressure swing) or membrane, and not necessarily a cryogenic air separation unit (ASU). Moreover, the purity requirements for the fuel are much less stringent than for syngas to be used in chemical synthesis.

The invention will be further elucidated by the following description of preferred embodiments thereof, given by way of non-limiting examples.

DETAILED DESCRIPTION

Figure 1:
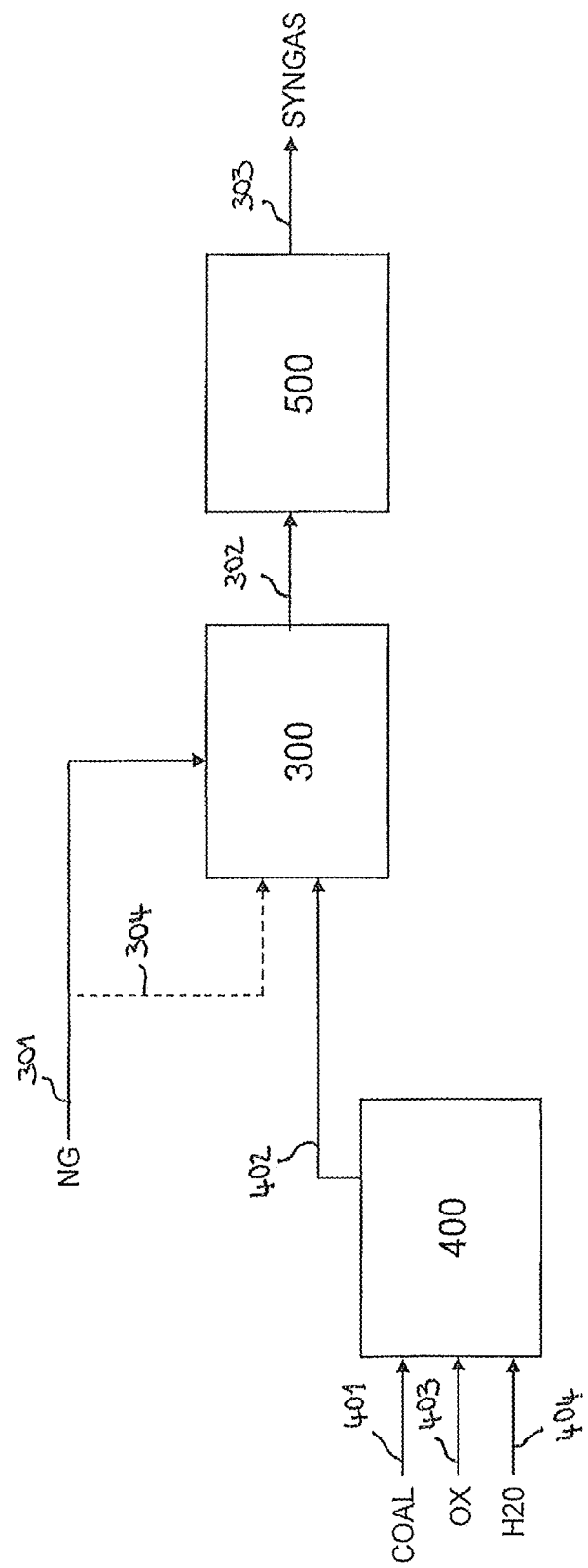
FIG. 1 is an illustrative scheme of the process for the production of hydrogen-containing synthesis gas according to an embodiment of the invention.

FIG. 1 illustrates a block scheme of a process for producing a hydrogen-containing synthesis gas according to an embodiment of the invention.

Block 300 denotes a reforming section, preferably of an ammonia plant, where a natural gas feedstock 301 is converted into a gas mixture 302, which is purified in a purification section 500 to obtain a product gas 303. The purification section 500 preferably comprises a shift section, a CO2 removal section (502, shown in FIG. 4) and optionally a methanation section.

Block 400 denotes a coal gasification section, where a coal feedstock 401 is converted into a gaseous fuel 402 by a gasification process with an oxidant such as air or oxygen 403 and water or steam 404.

The gaseous fuel 402 provides at least part of the total amount of fuel directed to the reforming section 300. Accordingly, the total amount of the feedstock 301 required for a particular production rate of ammonia is reduced. Alternatively, a larger amount of the feedstock 301 is available for the process, namely for generation of the product gas 303, hence the production of ammonia may be increased. Optionally, a portion of said fuel may be still taken from the natural gas feed 301. Said portion (also called fuel fraction) is represented with a dotted line 304 in the figure.

Figure 2:
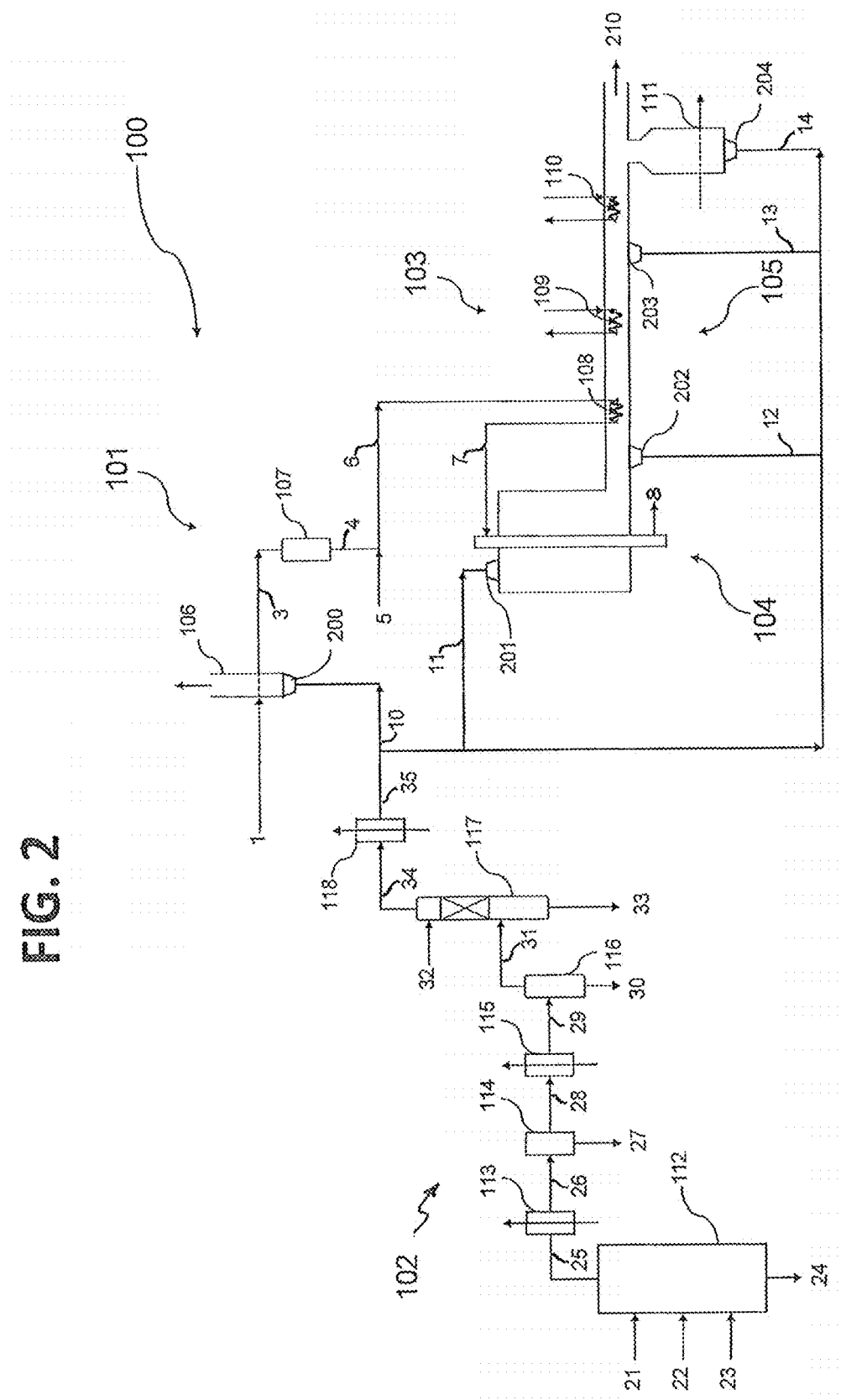
FIG. 2 is a scheme of the front-end section of an ammonia plant according to a first embodiment.

FIG. 2 shows a subunit 100 of the front-end section of an ammonia plant. Said subunit 100 comprises two sections: a first section 101 for the production of a reformed gas 8 from a natural gas feedstock 1, and a second section 102 for the gasification of a coal feedstock 21 and its conversion into a gaseous fuel 35.

Said first portion 101 comprises a primary reformer 103, which is in turn divided into a radiant section 104 and a convective section 105; a pre-heater 106 and a desulphurizer 107 which are positioned upstream said primary reformer 103.

The natural gas 1 enters said pre-heater 106, where it is heated to a first temperature, e.g. around 350° C., and subsequently is directed to said desulphurizer 107, resulting in a stream 4 of desuplhurized natural gas. Said outlet stream 4 is mixed with superheated steam 5 generating a stream 6 of process gas.

Said stream 6 is fed to the convective section 105 of the primary reformer 103 and it is further heated to a higher temperature, e.g. around 500° C., in a heat exchange coil 108.

The heated stream 7 is subsequently fed to the radiant section 104 of the primary reformer 103, containing an array of tubes filled with catalyst where the conversion into a hydrogen-containing synthesis gas is carried out. The radiant section 104 is provided with a series of burners 201 generating the reforming heat for the aforementioned conversion.

The convective section 105 of the primary reformer 103 substantially recovers heat from the flue gas generated by said burners, which leaves the reformer 103 at line 210. In particular, due to the high temperatures of said flue gas, the convective section 105 is mainly used to superheat the steam and to heat the process air feed to the secondary reformer (not shown in the figure). For these reasons, the convective section 105 is typically provided, besides the aforementioned heat exchange coil 108 for the feeding stream 7, with at least one steam superheater coil 109 and a heat exchange coil 110 for the process air.

FIG. 2 also shows an auxiliary boiler 111 separated from the reforming section 103 and producing additional steam. It should be noted that this setup is purely illustrative and several variants are possible.

As already said above, stream 35 of gaseous fuel is generated in a second section 102 where the gasification of a coal feedstock 21 takes place.

Said second section 102 comprises a gasifier 112 and a series of purification equipment for removing undesirable impurities, e.g. cyclone or gas filter 114 and hydrogen sulphide adsorber 117.

Said coal feedstock 21, an oxidant stream 22 and steam or water 23 are fed to said gasifier 112, where they react at a high temperature (typically around 1000° C. or higher) to produce a gaseous fuel 25 containing, besides $H_2$ and carbon monoxide, impurities like sulphur, nitrogen and mineral matter.

A continuous stream 24 of ash and unconverted carbon is provided from the bottom of said gasifier 112 to prevent the accumulation of solids in the gasifier 112 itself.

Said gaseous fuel 25 free of most solid particles leaves the gasifier 112 from the top and is passed through a heat recovery unit 113. Said heat recovery unit 113 typically comprises a high pressure steam waste boiler and/or a high pressure steam superheater. In some lower cost embodiments, the gasifier effluent can be cooled by water quench.

After waste heat recovery, the resulting cooled synthesis gas 26 flows through said cyclone or gas filter 114, which removes fine particulate matter 27 still present in the synthesis gas 26. Removing fine entrained solids 27 is an important step as fine particles in the synthesis gas may foul or corrode downstream equipment, reducing performance.

The resulting clean synthesis gas 28 leaves the cyclone 114 and flows to an arrangement of heat exchangers 115, where it is cooled with an optional heat recovery to near ambient temperature and condensed unreacted steam 30 is removed in a separator 116.

Subsequently, the cooled gas 31 leaving the separator 116 enters said absorber 117, in which it is scrubbed with a solvent 32 in order to remove hydrogen sulphide. The lean solvent 32 is typically an amine solution. Elemental sulphur may be recovered from this hydrogen sulphide by a suitable catalytic sulphur removal process (not shown in the figure). The loaded solvent is removed as stream 33 for external regeneration.

Said removal of hydrogen sulphide in the absorber 117 may optionally be carried out by means of a biological process.

The scrubbed gas 34 mainly containing CO and H2, leaving the top of the absorber 117, is optionally reheated in a heat exchanger 118 resulting in a heated stream 35.

Said stream 35 represents the fuel gas which provides the fired heating for the operation of the plant.

More in detail, referring to FIG. 2, said stream 35 fuels the burners 201 of the radiant section 104 and, if present, the burners 200 of the desulphurizer preheater 106, the burners 202, 203 of the convective section 105 and the burners 204 of the auxiliary steam generator 111.

According to FIG. 2, the fuel 35 is split into portions from 10 to 14, each supplying one of the aforementioned burners. In particular:

portion 10 fuels the burner 200 of the desulphurizer preheater 106;

portion 11 fuels the burner 201 of the radiant section 104;

portion 12 fuels the burner 202, provided to control the temperature of the stream 6 fed to the convective section 105;

portion 13 fuels the burner 203, provided to control the temperature of the superheated steam generated in the coil 110 of the convective section 105;

portion 14 fuels the burner 204 of the auxiliary steam generator 111.

Figure 3:
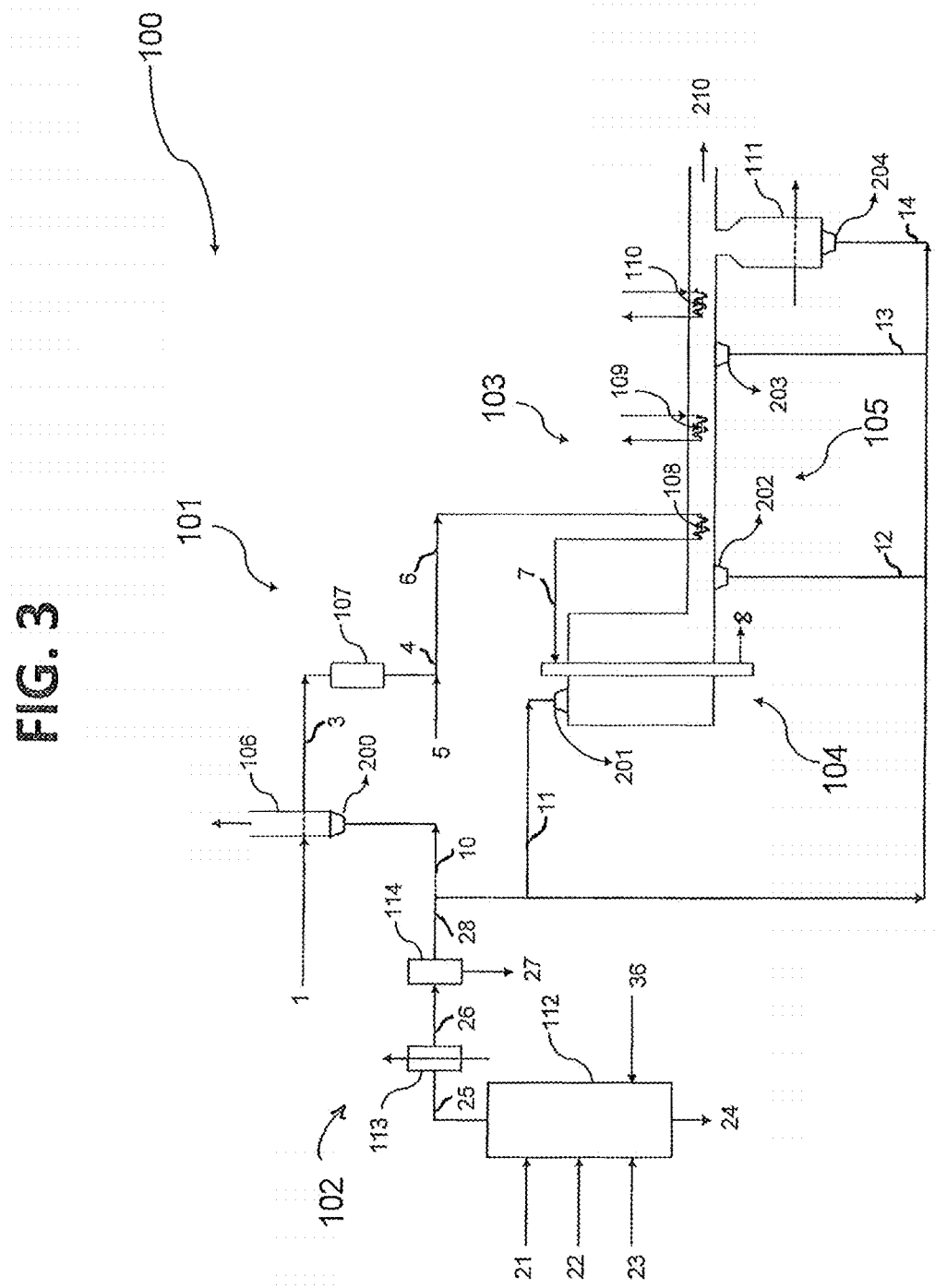
FIG. 3 is a scheme of the front-end section of an ammonia plant according to a second embodiment.

FIG. 3 shows another embodiment of the present invention, and the components are indicated by the same reference numbers.

The gasifier 112 is additionally supplied with a stream 36 of sulphur sorbent, typically limestone, in order to remove most of the sulphur present in the coal feedstock 21.

The spent sorbent is discharged from the bottom of the gasifier 112 together with ash and unconverted carbon in stream 24.

After passing through a heat recovery unit 113, a cyclone 114, the synthesis gas stream 28 substantially free of sulphur and solid particles is used as fuel and supplied to the burners.

Figure 4:
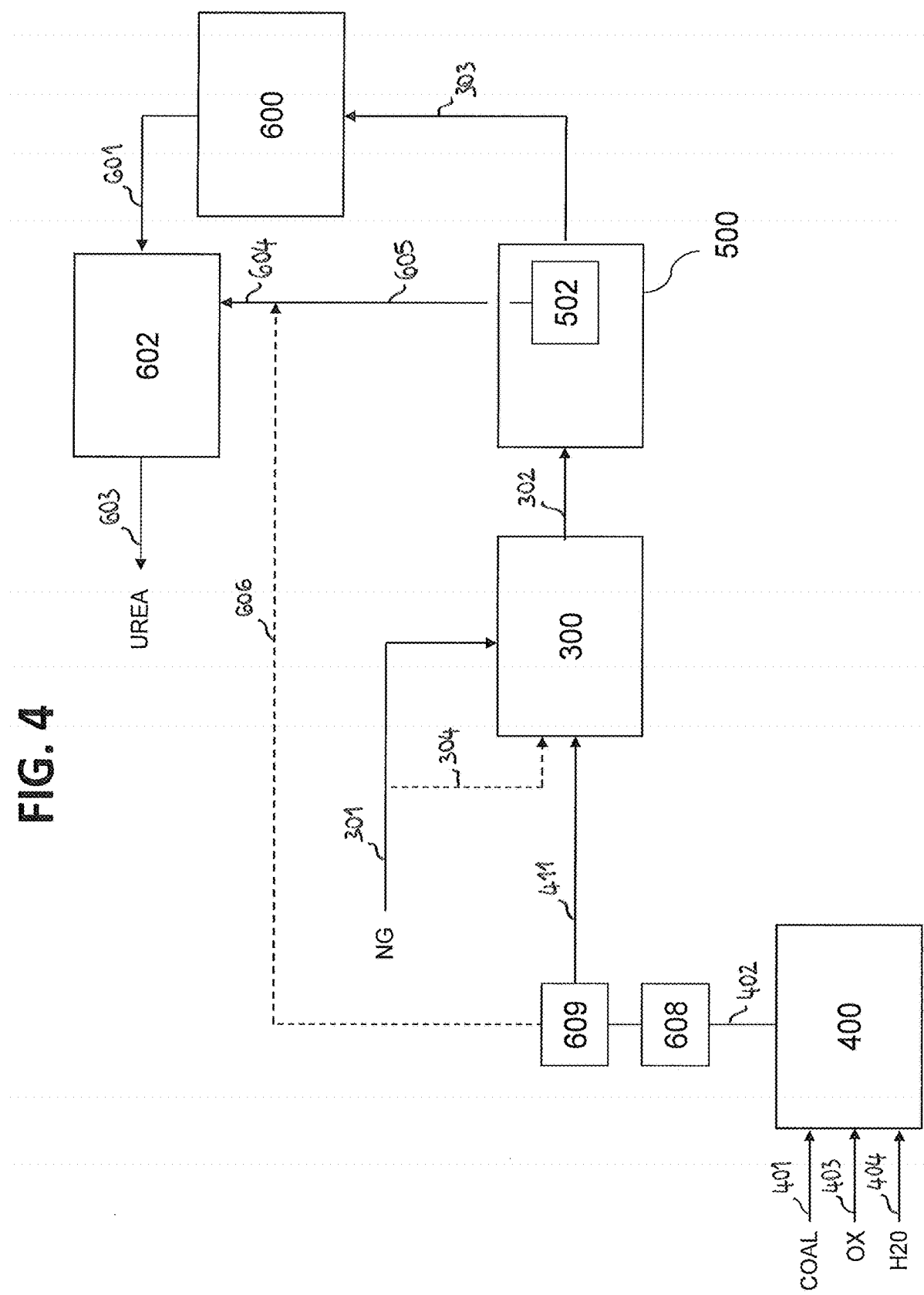
FIG. 4 is a scheme of an embodiment of the invention for ammonia-urea process.

FIG. 4 discloses another embodiment of the invention for implementation in an ammonia-urea plant. The syngas 303 is a make-up gas for synthesis of ammonia which is converted into ammonia 601 in an ammonia synthesis section 600. At least some or all of the ammonia 601 is used in a urea section 602 for the synthesis of urea 603 with a carbon dioxide feed 604.

A first portion 605 of the total CO2 requirement 604 for conversion of the ammonia into urea comes from the CO2 removal unit 502, typically comprising an MDEA or potassium carbonate washing unit, forming part of the purification section 500 of the reformed gas 302.

A second portion 606 of carbon dioxide is obtained from a portion of the fuel 402, i.e. from the gasification of coal. Said second portion 606 is a more substantial part of the total CO2 requirement 604 when the reforming section 300 only comprises a primary steam reformer and most or all the ammonia is converted to urea.

More in detail, said portion 402 is directed to a shift reactor 608 to convert the carbon monoxide contained therein into carbon dioxide. The so recovered carbon dioxide is separated, for example in a washing unit 609, and mixed with said first portion 605 to form the above mentioned feed 604. Desulphurization of 402 is not shown.

The remaining portion 411 of the fuel 402 is sent to the reforming section 300.

Example 1

An integrated ammonia/urea plant based entirely on natural gas as feed and fuel produces 2200 tonnes/day of ammonia of which approximately 85% is converted into urea, of which the production is accordingly 3300 tonnes/day. Total energy requirement for the integrated plant, which is completely supplied in the form of natural gas, amounts to 5.2 Gcal LHV basis per tonne of urea product, amounting in total to 715 Gcal/h. Of this total natural gas import, 3.1 Gcal/tonne (426 Gcal/h) is required as process feed for the steam reforming process, with the balance of 2.1 Gcal/t (289 Gcal/h) used as fuel in the steam reformer and for the generation and superheating of high pressure steam.

The whole of this natural gas consumption as fuel can in principle be replaced with a fuel gas generated from coal in a gasification facility as described herein. However it is assumed that due to miscellaneous losses the total LHV heating value required would be 10% higher (318 Gcal/h) after conversion from all natural gas firing to all coal-derived fuel gas. A fuel gas stream having a total LHV heating value of 318 Gcal/h can typically be produced by gasification of approximated 75 tonnes/h of bituminous coal (dry ash-free basis) at approximately 10 bar/1000° C. in a fluidized bed gasifier requiring around 45 tonnes/h of 95% purity oxygen.

By contrast a revamp of the 2200 tonnes/day ammonia plant forming part of an integrated ammonia/urea plant so as to use coal as process feedstock would require gasification of approximately 110 tonnes/h of bituminous coal (dry ash-free basis), typically at 50 bar with around 95 tonnes/h of oxygen at around 60 bar—requiring a much larger capital investment than the coal gasification scheme above. Moreover import of a material amount of high pressure steam from an external boiler plant (assumed to be coal fired) would be necessary to ensure sufficient steam and mechanical power for the ammonia plant and the downstream urea plant.

Example 2

In a plant for the methanol synthesis, whereby the gas production process is based on a pure steam reformer, 93.2% of the natural gas feed is required as process feed, with the balance of 6.8% used as fuel. The total gas consumption for methanol production according to this process route is around 7.4 Gcal/MT, based on the natural gas LHV.

Application of a first embodiment of the invention allows replacing the fuel fraction, which is 6.8%. Hence, it allows reducing the natural gas consumption to 93.2% of the original value, i.e. 6.9 Gcal/MT based on the gas LHV.

The amount of natural gas used as process feed can be drastically reduced by application of another embodiment of the invention, i.e. adding CO2 recovered from the gasifier effluent to the primary steam reforming. Accordingly, only 74.3% of the total original amount of natural gas is needed as process feed, or 5.5 Gcal/MT. The fuel fraction is produced by the gasifier. Hence, the gas consumption is reduced by more than 25%, compared to the original value of 7.4 Gcal/MT of methanol.

It is worth considering that in a methanol synthesis plant according to the art, whereby the syngas generation is based on a primary steam reformer followed by an oxygen auto-thermal reformer (i.e. based on combined reforming), the total natural gas consumption is 7.0 Gcal/MT. This value is still 20% higher than the consumption value achieved by the embodiment described above.

The invention can be applied also to a methanol plant based on combined reforming.

What is claimed is:

1. A method for revamping a plant for the production of a hydrogen-containing synthesis gas, said plant comprising a conversion section, at least one fired device producing heat for said conversion section and a fuel line being directed to said fired device;

said plant being fed with a natural gas feedstock and said natural gas feedstock being split into a first fraction used as process gas in the conversion section and a second fraction used as fuel and directed to said fired-device;

wherein:

a gasification section including a gasifier fed with a carbonaceous feedstock is added to said plant, wherein said carbonaceous feedstock is solid or liquid;

said gasification section being arranged to produce at least part of said fuel directed to said fired device, replacing a corresponding part of said second fraction of natural gas, wherein the conversion section includes a reforming section, and the effluent of said gasifier is used as fuel, not as a process gas, and provides at least part of the total amount of fuel directed to said reforming section.

\* \* \* \* \*